United States Patent [19]
Christman et al.

[11] 3,876,680

[45] Apr. 8, 1975

[54] CATALYST FOR THE HYDROGENATION OF AROMATICS

[75] Inventors: Robert D. Christman; Geoffrey R. Wilson, both of Pittsburgh, Pa.

[73] Assignee: Gulf Research & Development Company, Pittsburgh, Pa.

[22] Filed: Jan. 26, 1973

[21] Appl. No.: 326,692

Related U.S. Application Data

[63] Continuation-in-part of Ser. No. 272,018, July 14, 1972, abandoned.

[52] U.S. Cl................ 252/465; 208/143; 252/466 J
[51] Int. Cl.............................................. B01j 11/22
[58] Field of Search.................... 252/465; 208/143

[56] References Cited
UNITED STATES PATENTS

| | | |
|---|---|---|
| 2,744,052 | 5/1956 | Nozaki............................ 208/143 X |
| 3,242,101 | 3/1966 | Erickson et al..................... 252/465 |
| 3,297,588 | 1/1967 | Kehl et al........................ 252/465 X |
| 3,361,682 | 1/1968 | Keith et al...................... 208/143 X |
| 3,493,493 | 2/1970 | Henke et al..................... 208/143 X |
| 3,576,768 | 4/1971 | Kehl et al............................ 252/465 |
| 3,755,147 | 8/1973 | Michelson...................... 208/143 X |

*Primary Examiner*—Winston A. Douglas
*Assistant Examiner*—W. J. Shine

[57] ABSTRACT

Aromatic hydrocarbons are hydrogenated in the presence of hydrogen and a catalyst composite comprising at least two hydrogenating agents and an alumina support having a controlled bayerite concentration, average pore radius, and pore volume distribution and further having been calcined at a temperature in the range of 800°– 1,600° F. (427° – 871° C.) prior to impregnation of the hydrogenating agent.

5 Claims, No Drawings

CATALYST FOR THE HYDROGENATION OF AROMATICS

CROSS-REFERENCE TO RELATED APPLICATION

This application is a Continuation-In-Part of Application Ser. No. 272,018, filed July 14, 1972 now abandoned.

BACKGROUND OF THE INVENTION

The hydrogenation of aromatic hydrocarbons is well-known in the art. It is also known to use catalyst compositions in such hydrogenation processes comprising supported hydrogenating components consisting of at least one member of Group VI-B and at least one member of the Group VIII metals in a form capable of promoting hydrogenation reactions. Especially effective catalysts are those comprising nickel and tungsten. Other catalysts found to be effective include those containing nickel, cobalt and molybdenum, nickel and molybdenum and cobalt and molybdenum. The hydrogenating components of such catalysts can be employed in sulfided or unsulfided form.

Although the hydrogenating components indicated above can be employed in any proportions with each other, especially effective catalysts are those in which the hydrogenating components are those in the group consisting of oxides and sulfides comprising (a) a combination of 5 – 25 percent by weight of a Group VI-B metal and (b) 5 – 20 percent by weight of a Group VIII metal. The hydrogenating components can be composited with a porous alumina support. The alumina support is normally shaped in the form of granules, pellets or balls, prior to compositing the hydrogenating metals therewith. The catalyst composite, however, can be in other forms such as a powder which is employed for conventional fluid type operations.

Conventionally, in the preparation of the prior art catalyst composites the hydrogenation component such as tungsten is deposited on the support from an aqueous solution of the salt. After filtering and drying, the impregnate is calcined to convert it into the oxide. The carrier is then treated with an aqueous solution of the iron group metal salt such as nickel, followed by calcining. If a second iron group metal is employed, the second iron group metal can also be deposited in a like manner. Nitrates or acetates of the iron group metals are normally utilized although any water soluble salt which leaves no harmful residue can be employed.

If desired, the iron group metals and the Group VI-B metal can be deposited simultaneously but are preferably deposited in sequence with intervening calcining. Simultaneous impregnation of the iron group metals has been found to be satisfactory.

Calcining of the catalyst composite can be conducted by heating in air to a temperature of 800° to 1600° F. (427°–871° C.). When a sulfided catalyst is desired, the catalyst prepared as described above can be treated in a known manner with hydrogen sulfide or preferably a mixture of hydrogen and hydrogen sulfide. Typically, the catalyst composite can be presulfided after calcination, or calination and reduction, prior to contact with the charge stock, by contacting with a sulfiding mixture of hydrogen and hydrogen sulfide. Normally, the sulfiding is conducted at a temperature in the range of 500° to 650° F. (260° to 343° C.) at atmospheric or elevated pressures. Presulfiding can be conveniently effected at the beginning of an onstream period at the same conditions to be employed at the start of the hydrogenation process. The exact proportions of hydrogen and hydrogen sulfide are not critical and mixtures containing low or high portions of hydrogen sulfide can be used. Relatively low proportions are preferred for economical reasons. Elemental sulfur or sulfur compounds, such as mercaptans, can be used in lieu of hydrogen sulfide.

Although the above-identified catalyst compositions are useful in the hydrogenation of petroleum aromatic hydrocarbons, it is desirable to improve the efficiency of such aromatic hydrogenation processes at a given operating temperature and, in some instances, obtain high hydrogenation process conversions at lower operating temperatures.

Accordingly, an object of this invention is to provide an improved aromatic hydrogenation process.

Another object of the invention is to provide a novel catalyst composition for the hydrogenation of aromatic hydrocarbons.

Yet another object of the invention is to provide a process for the preparation of an improved hydrogenation catalyst composition.

Other objects, advantages and features of the invention will be readily apparent to those skilled in the art from the following description and appended claims.

SUMMARY OF THE INVENTION

An improved aromatic hydrocarbon hydrogenation process is obtained by employing in the hydrogenation process a catalyst composition comprising at least two hydrogenating agents deposited on a calcined alumina support and wherein at least 40 percent of the volume of pores of the catalyst composite will be in pores having a radius in the range of 50 – 300 A units, the average pore radius of the catalyst composite being at least 40 A units as a determined by nitrogen adsorption, the surface area of the catalyst composite being at least 150 square meters per gram, and the pore volume of the catalyst composite being at least 0.45 cubic centimeter per gram. Preferably, the catalyst composite employed in the hydrogenation process will have a pore volume of at least 0.60 cc/g as determined by the difference between mercury and helium densities by the procedure described in "Introduction to Principles of Heterogenous Catalysis" by J. M. Thomas and W. J. Thomas, Academic Press, 1967, pages 195 – 196, hereinafter referred to as the mercury test method. Further, the preferred catalyst composite shall have a maximum compacted density of 0.75 gram per cc.

DESCRIPTION OF THE INVENTION

As described in the parent application, an improved hydrogenation process is obtained by employing a catalyst composition comprising at least one hydrogenating component deposited on a calcined alumina support and wherein at least 40 percent of the volume of pores will be in pores having a radius in the range of 50 to 300 A units, the average pore radius of the catalyst being in the range of 40 to 80 A units, the surface area of the catalyst composite being at least 150 square meters per gram, and the pore volume of the catalyst being at least 0.4 cubic centimeter per gram. It has been discovered that this catalyst composition containing a metal from Group VI-B and a metal from Group VIII is effective as an aromatic hydrocarbon hydrogenation catalyst.

The novel catalyst is applicable to the hydrogenation of aromatic hydrocarbons and finds particular application in the hydrogenation of aromatic hydrocarbons obtained from petroleum fractions. Examples of petroleum fraction feeds particularly suitable in the process of this invention are kerosene, furnace oils, gas oils and cycle oils obtained by conventional catalytic cracking processes.

The improved hydrogenation catalysts of this invention can be prepared by depositing a Group VI-B metal component and a Group VIII metal component on a calcined alumina support so as to obtain a catalyst composite having a relatively large average pore radius of at least 40 A units. Additionally, at least 40 percent of the pore volume of the catalyst composite, as determined by the nitrogen adsorption method described by E. V. Ballou, O. K. Dollen, in Analytical Chemistry, Volume 32, page 532, 1960, is contained in pores having a radius in the range of 50 – 300 A units. The pore volume distribution figures employed in this application are all obtained by the nitrogen adsorption method. The pore volume as determined by nitrogen adsorption of the catalyst composite should be at least 0.45 cc per gram and the surface area of the catalyst composite should be at least 150 square meters per gram. The pore radius as employed in this application is determined by multiplying the pore volume by $2 \times 10^4$ and dividing the result by the surface area.

A preferred catalyst composition comprises a catalyst composite as described above with the further limitation that the catalyst composite shall have a maximum compacted density of 0.75 gram per cubic centimeter and shall have a pore volume of at least 0.60 cubic centimeter per gram as determined by the mercury test method previously described. The compacted density as employed in this application refers to the test method whereby four substantially equal portions of the catalyst are added to a graduated cylinder with the side of the graduated cylinder tapped after the addition of each portion until a final catalyst level is obtained. After a measured volume, normally 200 ml of catalyst, is obtained in the graduated cylinder, the weight of the catalyst is determined and the final compacted density calculated by dividing the total catalyst weight with the volume of the catalyst in the graduated cylinder.

In preparation of the hydrogenation catalyst compositions, an alumina support containing less than 2.0 weight percent impurities, such as silica, and having a bayerite content of 0 to 50 weight percent is employed. Although not to be limited thereto, desirably the minimum particle diameter of the alumina support material employed in forming the catalyst composite falls within the range of one-eight to one-sixteenth inch. The pore volume of the alumina support should be at least 0.65 cc per gram as determined by nitrogen adsorption and the average pore radius should be at least 32 A units. The pore size distribution of the alumina support should be such that at least 25 percent of the pore volume is contained in pores having a radius in the range of 50 to 300 A units.

In the preparation of the low compacted density catalyst compositions of this invention, the pore volume of the alumina support should be at least 0.65 cc per gram as determined by the nitrogen adsorption method and should be at least 0.75 cc per gram as determined by the mercury test method.

In preparation of the catalyst composite, the alumina support is dried to remove any free water therefrom. Typically, the alumina can be dried at a temperature of 250° F. (121° C.) for a time ranging from 4 to 24 hours. Thereafter, the alumina is calcined at a temperature in the range from 0b 800° to 1600° F. (427° – 871° C.) in an oxygen-containing atmosphere, such as air, for a period ranging from 1 to 24 hours, prior to impregnation of the alumina with the hydrogenation metals.

The preparation of the catalyst composite, as hereafter described, will be especially suitable to nickel-tungsten-on-alumina catalyst composites although it will be understood by those skilled in the art that the preparation method described herein can also be adapted to other Group VI-B and Group VIII hydrogenation metal catalysts.

The alumina support, such as extruded alumina pellets, pretreated by the procedure described above, can be admixed with tungsten which is in the form of any water-soluble compound of tungsten, the tungsten being present as the anion. Ammonium salts of tungstic acid and particularly ammonium metatungstate, ammonium tungstate or ammonia silica-dodecatungstate can be employed in the impregnation procedure. The concentration of tungsten in the finished catalyst should be in the range of 5 – 25 percent by weight. The wet impregnated alumina is then preferably dried at, for example, a temperature of 250° F. (121° C.) for a period of time ranging from 4 up to 24 hours. Following drying, the alumina impregnated with the tungsten can be calcined.

Thereafter, the alumina support can be contacted with an aqueous solution of a nickel salt such as the nitrate, sulfate, or chloride. Alternatively, salts of organic acids such as acetate, formate, or propionate can be utilized. Sufficient salt is admixed with the aqueous support so as to provide a catalyst composite containing from 5 – 20 percent by weight nickel. The wet catalyst composite can then be dried in a second drying step at a temperature of, for example, 250° F. (121° C.) for 24 hours. Following the drying step, the catalyst composite can then be calcined at a temperature in the range of 800° to 1600° F. (427° – 871° C.) for a period of 1 to 24 hours.

Although a two-step impregnation catalyst preparation procedure has been described, it is within the skill of the art, and the scope of this invention, to employ a single impregnation step in adding the hydrogenation metals to the alumina support. As previously noted, when the use of the catalyst in sulfided form is desired, the catalyst can be presulfided, after calcination, or after calcination and reduction.

The catalyst composite as prepared will have an average pore radius of at least 40 A units, preferably from 45 to 75 A units. The radius of the pores comprising at least 40 percent, preferably at least 65 percent, of the nitrogen pore volume will be in the range from 50 to 300 A units. The pore volume of the catalyst composite will be at least 0.45 cc per grams, preferably at least 0.50 cc per grams, as determined by nitrogen adsorption. The surface area of the catalyst composite will be at least 150 square meters per gram.

The low density catalyst composites of this invention will, in addition to the characteristics described in the above paragraph, have a pore volume of at least 0.60 cc per gram as determined by the mercury test method and will have a maximum compacted density of 0.75 gram per cc.

The hydrogenation reactions effected pursuant to the process of this invention can be conducted at a temperature in the range of 500° to 800° F. (260 to 427° C.), preferably 550° to 750° F. (277° to 388° C.). The hydrogenation process is conducted by contacting the catalyst composite with the aromatic feed in the presence of uncombined hydrogen partial pressures in the range of 200 to 4,000 psig (14.1 to 282.0 kilograms per cm²). Hydrogen is circulated through the reactor at a rate between about 700 and 15,000 standard cubic feet (19.9 to 42.7 cubic meters) per barrel of feed with the hydrogen purity varying from 60 to about 100 percent.

After the hydrogen is recycled, it may be necessary to provide for bleeding off a portion of the recycled gas and to make up hydrogen in order to maintain the hydrogen purity within the range specified. If desired, the recycled gas can be washed with a chemical absorbent for hydrogen sulfide or otherwise treated in a conventional manner to reduce the hydrogen sulfide content thereof prior to recycling.

The hydrogenation reaction can be continuously conducted in the liquid or vapor phase and at a liquid weight hourly space velocity in the range of 0.25 to 10, preferably 0.5 to 3.0. Reaction zone pressures in the range of 200 to 5,000 psig (14.1 to 353 kilograms per square centimeter), normally in the range of 750 to 2,000 psig (52.7 to 140.5 kilograms per square centimeter), are maintained in the hydrogenation zone.

The following examples are presented to demonstrate the objects and advantages of the invention. It is not intended, however, to limit the invention to the specific embodiments presented therein.

EXAMPLE 1

In this example a catalyst composite containing 6.0 weight percent nickel and 19.0 weight percent tungsten was prepared. A solution of 80.55 grams of ammonium metatungstate (92.5 weight percent $WO_3$) in 309 ml of distilled water was employed to impregnate 212.7 grams of commercial 1/16-inch (.159 cm) calcined alumina extrudates dried overnight at a temperature of 700° F. (371° C.) prior to use. The alumina support had a compacted density of 0.411 grams per cc, a surface area of 217.6 square meters per gram, a pore volume of 0.792 cc's per gram as determined by the nitrogen adsorption test method, and a pore radius of 72.8 A units. The pore volume distribution of the alumina support was as shown below:

Pore Volume Distribution
% of Pore Vol. in Pores of

| | | |
|---|---|---|
| 250–300 | A radius | 2.2 |
| 200–250 | | 5.2 |
| 150–200 | | 10.3 |
| 100–150 | | 24.0 |
| 90–100 | | 7.6 |
| 80–90 | | 10.2 |
| 70–80 | | 10.6 |
| 60–70 | | 9.3 |
| 50–60 | | 7.1 |
| 45–50 | | 3.1 |
| 40–45 | | 3.0 |
| 35–40 | | 2.2 |
| 30–35 | | 2.3 |
| 25–30 | | 2.1 |
| 20–25 | | 0.7 |
| 15–20 | | 0.0 |
| 10–15 | | 0.0 |
| 7–10 | | 0.0 |

The wet extrudates were oven dried overnight at 250° F. (121° C.) and then impregnated with a solution of 118.8 grams of nickel nitrate hexahydrate in 226 ml of distilled water. The wet extrudates were again oven dried overnight at 250° F. (121° C.) and calcined at 1000° F. (538° C.) by raising the temperature to 1000° F. (538° C.) in about 6 hours and holding at that temperature for about 10 hours.

The prepared catalyst had a surface area of 162.6 square meters per gram, a pore volume of 0.511 cc/g as determined by nitrogen adsorption, a pore volune of 0.75 g/cc as determined by the mercury test method, a compacted density of 0.646 grams per cc, and a pore radius of 62.9 A units. The pore volume distribution as determined by nitrogen adsorption is as shown below:

Pore Volume Distribution
% of Pore Vol. in Pores of

| | | |
|---|---|---|
| 250–300 | A radius | 2.3 |
| 200–250 | | 5.1 |
| 150–200 | | 9.8 |
| 100–150 | | 21.8 |
| 90–100 | | 6.6 |
| 80–90 | | 9.1 |
| 70–80 | | 10.1 |
| 60–70 | | 9.6 |
| 50–60 | | 7.8 |
| 45–50 | | 3.7 |
| 40–45 | | 3.2 |
| 35–40 | | 3.0 |
| 30–35 | | 2.1 |
| 25–30 | | 2.7 |
| 20–25 | | 2.3 |
| 15–20 | | 0.9 |
| 10–15 | | 0.0 |
| 7–10 | | 0.0 |

EXAMPLE 2

In this example a catalyst composite containing 12.5 weight percent nickel and 12.5 weight precent tungsten was prepared. A solution of 52.3 grams of ammonium metatungstate dissolved in 305 ml of distilled water was used to impregnate 209.6 grams of the commercial calcined 1/16 inch (.159 cm) alumina extrudates of Example 1 dried overnight at 700° F. (371° C.) prior to use. The wet extrudates were dried overnight at 250° F. (121° C.) and impregnated with a solution of 244.2 grams of nickel nitrate hexahydrate dissolved in 270 ml of distilled water. The wet extrudates were than oven dried overnight and calcined by raising the temperature to 1,000° F. (538° C.) in about 6 hours and holding the extrudates at that temperature for 10 hours.

The prepared catalyst had a surface area of 172.6 square meters per gram, a pore volume of 0.517 cc per gram as determined by nitrogen adsorption, a pore volume of 0.745 cc per grams as determined by the mercury test method, a compacted density of 0.660 gram per cc, and a pore radius of 59.9 A units. The pore volume distribution as determined by nitrogen adsorption is as shown below:

Pore Volume Distribution
% of Pore Vol. in Pores of

| | | |
|---|---|---|
| 250–300 | A radius | 2.3 |
| 200–250 | | 4.8 |
| 150–200 | | 9.0 |
| 100–150 | | 21.3 |
| 90–100 | | 6.4 |
| 80–90 | | 8.7 |
| 70–80 | | 8.5 |
| 60–70 | | 8.5 |
| 50–60 | | 9.5 |
| 45–50 | | 3.5 |

-Continued

Pore Volume Distribution
% of Pore Vol. in Pores of

| | |
|---|---|
| 40–45 | 3.4 |
| 35–40 | 3.3 |
| 30–35 | 2.5 |
| 25–30 | 3.1 |
| 20–25 | 2.7 |
| 15–20 | 2.5 |
| 10–15 | 0.0 |
| 7–10 | 0.0 |

EXAMPLE 3

The catalyst preparation procedure of Example 1 was repeated with the exception that the procedure was adapted to produce catalyst composites containing varying amounts of nickel and tungsten. The concentrations of metals on the alumina support and the characteristics of the prepared catalyst composites (hereinafter referred to as Catalyst A, B and C) are as set forth below:

| | Catalyst A | Catalyst B | Catalyst C |
|---|---|---|---|
| Concentration of nickel, Wt. % of cat. composite | 8.0 | 5.0 | 9.0 |
| Concentration of tungsten, Wt. % of cat. composite | 8.0 | 5.0 | 16.0 |
| Surface area, sq. meters per gram | 184.6 | 199.9 | 166.0 |
| Pore volume (nitrogen adsorption), cc's/g | 0.624 | 0.678 | 0.527 |
| Pore radius, A units | 67.7 | 67.9 | 63.5 |
| Pore volume distribution % of Pore vol. in Pores of | | | |
| 250–300    A radius | 2.4 | 2.5 | 2.3 |
| 200–250 | 5.7 | 5.1 | 4.7 |
| 150–200 | 10.1 | 10.2 | 10.2 |
| 100–150 | 22.9 | 23.8 | 22.0 |
| 90–100 | 4.8 | 7.0 | 6.8 |
| 80–90 | 11.5 | 9.6 | 9.1 |
| 70–80 | 9.6 | 10.2 | 9.4 |
| 60–70 | 9.8 | 9.2 | 9.1 |
| 50–60 | 7.3 | 7.0 | 7.3 |
| 45–50 | 3.7 | 3.6 | 3.8 |
| 40–45 | 2.9 | 2.7 | 3.2 |
| 35–40 | 2.9 | 2.9 | 3.2 |
| 30–35 | 2.2 | 1.9 | 2.5 |
| 25–30 | 2.2 | 2.3 | 2.8 |
| 20–25 | 2.2 | 2.1 | 2.9 |
| 15–20 | 0.0 | 0.0 | 0.5 |
| 10–15 | 0.0 | 0.0 | 0.0 |
| 7–10 | 0.0 | 0.0 | 0.0 |
| Compacted density, g/cc | .587 | .512 | .649 |

EXAMPLE 4

The catalyst preparation method of Example 3 (Catalyst A) was repeated with the exception that a single impregnation step was employed in the addition of the nickel and tungsten to an alumina support having the following properties:

| | | |
|---|---|---|
| Surface area, sq. meters per gram | | 206 |
| Compacted density, g/cc | | 0.49 |
| Pore volume (nitrogen adsorption), cc's/g | | 0.89 |
| Pore volume (ml/g) in pores less than | | |
| 120 | A diameter | 0.45 |
| 200 | | 0.83 |
| 350 | | 0.86 |
| 700 | | 0.87 |
| 1,000 | | 0.88 |
| 10,000 | | 0.89 |
| 152,000 | | 0.89 |
| Mercury Density | | 0.84 |

The properties of the catalyst composite was as shown below:

| | | |
|---|---|---|
| Surface area, sq. meters per gram | | 194.6 |
| Compacted density, g/cc | | .561 |
| Pore volume (nitrogen adsorption), cc's/g | | 0.470 |
| Pore radius, A units | | 48.4 |
| Pore volume distribution % of Pore vol. in Pores of | | |
| 250–300 | A radius | 0.5 |
| 200–250 | | 0.9 |
| 150–200 | | 1.6 |
| 100–150 | | 5.1 |
| 90–100 | | 10.9 |
| 80–90 | | 13.3 |
| 70–80 | | 14.0 |
| 60–70 | | 13.6 |
| 50–60 | | 11.7 |
| 45–50 | | 4.8 |
| 40–45 | | 4.8 |
| 35–40 | | 4.7 |
| 30—35 | | 3.1 |
| 25–30 | | 3.9 |
| 20–25 | | 3.8 |
| 15–20 | | 3.4 |
| 10–15 | | 0.0 |
| 7–10 | | 0.0 |

EXAMPLE 5

In this example the catalyst composite of Example 1 was employed to hydrogenate a feed comprised of 29.5 volume percent saturated hydrocarbons, 4.5 volume percent olefins, 66.0 volume percent aromatics, and further characterized as follows:

| | |
|---|---|
| Gravity, °API | 26.2 |
| Sulfur, Wt. % | 0.62 |
| Nitrogen, (ppm) | 260 |
| Distillation, ASTM, °C. | |
| 10% | 218°C. |
| 50% | 260°C. |
| 90% | 312°C. |

The hydrocarbon feed was continuously charged to the reactor containing the the catalyst composite at a space velocity of 1.0 volume of feed per hour per volume of catalyst. A pressure of 105.6 kilograms per square centimeter was maintained in the hydrogenation zone. Hydrogen gas of 75 volume percent purity was passed at the rate of 284 cubic meters per barrel of hydrocarbon feed to the hydrogenation zone. Two hydrogenation runs were conducted under the stated conditions with an operating temperature in the first run of 360° C. and the second run conducted at a reaction temperature of 371° C.

The product recovered from the hydrogenation zone was analyzed for aromatic concentration with the results shown below:

| | Vol. % Aromatics |
|---|---|
| Operating temp. of 360° C. | 37.5 |
| Operating temp. of 371° C. | 36 |

From the above it can be seen that 43.2 and 45.4 percent, respectively, of the aromatics in the feed to the hydrogenation zone were hydrogenated.

EXAMPLE 6

In this example the runs of Example 5 were repeated with the exception that the 0.159 centimeter diameter catalyst particles comprising 6.0 weight percent nickel, 19.0 weight percent tungsten and alumina had the following properties:

| | | |
|---|---|---|
| Surface area, sq. meters per gram | | 209.3 |
| Compacted density, g/cc | | 0.826 |
| Pore volume (nitrogen adsorption), cc's/g | | 0.496 |
| Pore radius, A units | | 60.7 |
| Pore volume distribution % of Pore vol. in Pores of | | |
| 250–300 | A radius | 1.3 |
| 200–250 | | 2.4 |
| 150–200 | | 4.0 |
| 100–150 | | 10.8 |
| 90–100 | | 5.0 |
| 80–90 | | 7.9 |
| 70–80 | | 9.1 |
| 60–70 | | 10.4 |
| 50–60 | | 11.0 |
| 45–50 | | 6.1 |
| 40–45 | | 6.3 |
| 35–40 | | 6.2 |
| 30–35 | | 5.7 |
| 25–30 | | 5.7 |
| 20–25 | | 5.2 |
| 15–20 | | 3.1 |
| 10–15 | | 0.0 |
| 7–10 | | 0.0 |
| Pore volume (mercury test method), cc/g | | .53 |

The product recovered from the hydrogenation zone was analyzed for aromatics concentrations, with the results shown below:

| | Vol. % Aromatics |
|---|---|
| Operating temp. of 360° C. | 37.5 |
| Operating temp. of 371° C. | 35.5 |

A comparison of the results obtained from this example with the results obtained in Example 5 demonstrates that a catalyst composite having a substantially lower compacted density (0.646 vs. 0.826) is substantially equally effective in the hydrogenation of aromatic hydrocarbons. Thus, it is evident that substantial economic advantage would result from employing the catalyst composite of Example 1 in commercial aromatic hydrogenation processes in that the cost for each reactor fill would be substantially lower.

EXAMPLE 7

In this example a catalyst composite prepared by employing a single impregnation step was employed in the hydrogenation of an aromatic feed. The catalyst composite comprising 6 weight percent nickel, 19 weight percent tungsten and alumina had the following properties:

| | | |
|---|---|---|
| Surface area, sq. meters per gram | | 166 |
| Compacted density, g/cc | | .682 |
| Pore volume (nitrogen adsorption), cc's/g | | .51 |
| Pore volume (mercury test method, cc's/g | | .58 |
| Pore volume distribution % of Pore vol. in Pores of | | |
| 250–300 | A radius | 2.7 |
| 200–250 | | 5.0 |
| 150–200 | | 13.2 |
| 100–150 | | 24.6 |
| 90–100 | | 6.1 |
| 80–90 | | 7.3 |
| 70–80 | | 7.2 |
| 60–70 | | 7.6 |
| 50–60 | | 6.4 |
| 45–50 | | 3.3 |
| 40–45 | | 3.0 |
| 35–40 | | 3.5 |
| 30–35 | | 2.0 |
| 25–30 | | 3.3 |
| 20–25 | | 2.9 |
| 15–20 | | 1.9 |
| 10–15 | | 0.0 |
| 7–10 | | 0.0 |
| Pore radius, A units | | 61.3 |

A hydrocarbon feed comprising 75.5 volume percent aromatics, 6.0 volume percent olefins and 18.5 volume percent saturated hydrocarbons was continuously charged to a hydrogenation reactor containing the above identified catalyst composite having an average particle diameter size of 0.15 centimeter. A space velocity of 1.0 volume of feed per hour per volume of catalyst was maintained during the run. The pressure within the hydrogenation zone was 105.6 kilograms per square meter and hydrogen gas of 75 volume percent purity was passed to the hydrogenation zone at the rate of 284 cubic meters per barrel of hydrocarbon feed. Three hydrogenation runs were conducted under the stated conditions with the operating temperatures in the runs comprising 343° C., 360° C. and 377° C. respectively.

For each run the product recovered from the hydrogenation zone was analyzed for aromatics concentration with the results shown below:

| | Vol. % Aromatics |
|---|---|
| Operating temp. of 343° C. | 52.5 |
| Operating temp. of 360° C. | 48.5 |
| Operating temp. of 377° C. | 48.0 |

EXAMPLE 8

In this example a catalyst composite comprising 6.0 weight percent nickel, 19.0 weight percent tungsten and alumina was employed in the hydrogenation of the hydrocarbon feed of Example 5. The catalyst composite with an average particle diameter of 0.15 centimeter had the following properties:

| | | |
|---|---|---|
| Surface area, sq. meters per gram | | 158.3 |
| Compacted density, g/cc | | 0.947 |
| Pore volume (nitrogen adsorption), cc's/g | | .323 |
| Pore volume (mercury test method), cc/g | | .35 |
| Pore radius, A units | | 40.9 |
| Pore volume distribution % of Pore vol. in Pores of | | |
| 250–300 | A radius | 2.1 |
| 200–250 | | 2.3 |
| 150–200 | | 3.5 |
| 100–150 | | 7.2 |

-Continued

| | |
|---|---|
| 90–100 | 3.9 |
| 80–90 | 5.8 |
| 70–80 | 7.3 |
| 60–70 | 9.6 |
| 50–60 | 10.6 |
| 45–50 | 6.8 |
| 40–45 | 6.7 |
| 35–40 | 7.5 |
| 30–35 | 6.1 |
| 25–30 | 7.6 |
| 20–25 | 6.1 |
| 15–20 | 6.7 |
| 10–15 | 0.2 |
| 7–10 | 0.0 |

Comparing the catalyst composite of this example with the catalyst composite of Example 1, it can be seen that the catalyst composite of this example has a substantially higher compacted denisty (0.947 vs. 0.646 g's/cc), a substantially lower pore radius (40.9 vs. 62.9 A units), and a substantially lower pore volume as determined by both the nitrogen and mercury test methods (0.323 vs. 0.511 and 0.35 vs. 0.75 g/cc, respectively). The effect of these distinguishing catalyst characteristics in the hydrogenation of aromatic hydrocarbons was demonstrated by conducting runs under the condition, including operating temperatures, of Example 5.

For each of the 2 runs the aromatics concentration of the product was determined with the results shown below:

| | Vol. % Aromatics |
|---|---|
| Operating temp. of 360° C. | 43.0 |
| Operating temp. of 371° C. | 40.5 |

From the above it can be seen that 34.9 and 38.6 percent respectively of the aromatics in the feed to the hydrogenation zone were hydrogenated. A comparison of the results obtained in this example and Example 5 demonstrates the substantial improvement in aromatic hydrogenation activity as a result of employing the novel catalyst composition of this invention.

Although the invention has been described with reference to specific embodiments, references, and details, various modifications and changes will be apparent to one skilled in the art and are contemplated to be embraced in this invention.

We claim:

1. A process for preparing a hydrogenation catalyst which comprises calcining an alumina support having a bayerite content in the range of 0 to 50 weight percent at a temperature in the range of 427°–871° C. for a period ranging from 1 to 24 hours, at least 25 percent of the volume of pores of the alumina support being in pores having a radius in the range of 50 to 300 A units, the average pore radius of said alumina support being at least 32 A units, the pore volume of said alumina support being at least 0.65 cubic centimeter per gram as determined by nitrogen adsorption and at least 0.75 cubic centimeter per gram as determined by the mercury test method, thereafter admixing said alumina support with compound of a hydrogenating metal selected from Group VI-B thermally convertible to the oxide and a compound of a hydrogenating metal selected from Group VIII thermally convertible to the oxide, and calcining the resultant catalyst composite at a temperature in the range of 427°–871° C. for a period ranging from 1 to 24 hours.

2. The process of claim 1 wherein the hydrogenating compounds are admixed with the alumina support so as to obtain a catalyst containing from 5 to 25 percent by weight of tungsten and from 5 to 20 percent by weight of nickel.

3. The process of claim 1 wherein admixing the hydrogenating compounds with the alumina support comprises initially impregnating the alumina support with the Group VI-B metal compound and thereafter impregnating the alumina support with the Group VIII metal compound in a second impregnation step.

4. A catalytic composition comprising at least one Group VI-B metal oxide and at least one Group VIII metal oxide composited with an alumina base, at least 40 percent of the volume of pores of the catalyst composite being in pores having a radius in the range of 50 to 300 A units, the average pore radius of said catalyst composite being at least 40 A units as determined by nitrogen adsorption, the surface area of said catalyst composite being at least 150 square meters per gram, the pore volume of said catalyst composite being at least 0.45 cubic centimeter per gram as determined by nitrogen absorption and at least 0.60 cubic centimeter per gram as determined by the mercury test method, and said catalyst composite having a maximum compacted density of 0.75 gram per cc.

5. The catalytic composition of claim 4 wherein the hydrogenating metal selected from Group VI-B is tungsten which comprises from 5 to 25 percent by weight of said catalyst composite and the hydrogenating metal selected from Group VIII is nickel which comprises from 5 to 20 percent by weight of said catalyst composite.

* * * * *

UNITED STATES PATENT OFFICE
CERTIFICATE OF CORRECTION

PATENT NO. : 3,876,680
DATED : April 8, 1975
INVENTOR(S) : Robert D. Christman and Geoffrey R. Wilson It is certified that error appears in the above-identified patent and that said Letters Patent are hereby corrected as shown below:

Col. 1, line 62, "calination" should read --calcination--.
Col. 2, line 36, after as delete "a"
Col. 3, line 51, "one-sixteenth" should read --one-sixty--.
Col. 4, line 3, after from delete "0b".
Col. 4, lines 56 & 57, "grams" should read --gram--.
Col. 5, line 67, "226" should read --266--.
Col. 6, line 8, "volune" should read --volume--.
Col. 6, line 52, "grams" should read --gram--.
Col. 8, line 47, after the delete "the".
Col. 11, line 16, "denisty" should read --density--.
Col. 11, line 24, "condition" should read --conditions--.
Claim 4, line 40, "absorption" should read --adsorption--.

Signed and Sealed this twenty-seventh Day of January 1976

[SEAL]

Attest:

RUTH C. MASON
*Attesting Officer*

C. MARSHALL DANN
*Commissioner of Patents and Trademarks*